(12) United States Patent
Sakuda et al.

(10) Patent No.: US 7,626,719 B2
(45) Date of Patent: Dec. 1, 2009

(54) IMAGE INPUT DEVICE, IMAGE INPUT/OUTPUT DEVICE AND METHOD OF SETTING INFORMATION FOR COMMUNICATION

(75) Inventors: Kenji Sakuda, Nagano (JP); Yoshinao Kitahara, Nagano (JP); Hideki Morozumi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 340 days.

(21) Appl. No.: 11/223,078

(22) Filed: Sep. 8, 2005

(65) Prior Publication Data

US 2006/0056371 A1 Mar. 16, 2006

(30) Foreign Application Priority Data

Sep. 8, 2004 (JP) .............................. 2004-260571

(51) Int. Cl.
*G06K 15/00* (2006.01)
*G06F 1/32* (2006.01)
(52) U.S. Cl. ..................................... 358/1.15; 358/474
(58) Field of Classification Search ................. 358/1.1, 358/1.8, 1.13, 1.15, 402, 500, 448; 709/218, 709/220, 221, 242
See application file for complete search history.

(56) References Cited

U.S. PATENT DOCUMENTS

| 6,880,019 | B1 * | 4/2005 | Toyoda ........................ 709/238 |
| 7,451,480 | B2 | 11/2008 | Yamamoto |
| 2004/0003060 | A1 * | 1/2004 | Asoh et al. ................... 709/220 |
| 2004/0198319 | A1 * | 10/2004 | Whelan et al. .............. 455/411 |
| 2005/0279833 | A1 * | 12/2005 | Tanaka ................... 235/462.46 |

FOREIGN PATENT DOCUMENTS

| JP | 1-287789 A | 11/1989 |
| JP | 11-298500 A | 10/1999 |
| JP | 2002-185512 A | 6/2002 |
| JP | 2003-198770 A | 7/2003 |
| JP | 2004-078392 A | 3/2004 |
| JP | 2004-193753 A | 7/2004 |

* cited by examiner

*Primary Examiner*—Gabriel I Garcia
(74) *Attorney, Agent, or Firm*—Sughrue Mion, PLLC

(57) ABSTRACT

A device is disclosed. A reader is adapted to optically read contents described on a medium as an image and converting the image into image data. A network interface is adapted to be connected to a network. A communicator communicates data with a mating device through the network interface in accordance with setting information of a prescribed protocol. An acquirer acquires the setting information from the image data. A setter sets the acquired setting information to the communicator.

10 Claims, 9 Drawing Sheets

FIG. 3

| NETWORK SETTING ORDER SHEET (No.1) |
|---|

○ IP ADDRESS AUTOMATIC SETTING  ○ IP ADDRESS MANUAL SETTING

IP ADDRESS

SUBNET MASK

DEFAULT GATEWAY

FIG. 4

NETWORK SETTING ORDER SHEET (No2)

◯ DNS AUTOMATIC SETTING    ◯ DNS MANUAL SETTING

DNS SERVER (PRIMARY)

[ ][ ][ ] . [ ][ ][ ] . [ ][ ][ ] . [ ][ ][ ]

9 ◯◯◯ ◯◯◯ ◯◯◯ ◯◯◯
8 ◯◯◯ ◯◯◯ ◯◯◯ ◯◯◯
7 ◯◯◯ ◯◯◯ ◯◯◯ ◯◯◯
6 ◯◯◯ ◯◯◯ ◯◯◯ ◯◯◯
5 ◯◯◯ ◯◯◯ ◯◯◯ ◯◯◯
4 ◯◯◯ ◯◯◯ ◯◯◯ ◯◯◯
3 ◯◯◯ ◯◯◯ ◯◯◯ ◯◯◯
2 ◯◯◯ ◯◯◯ ◯◯◯ ◯◯◯
1 ◯◯◯ ◯◯◯ ◯◯◯ ◯◯◯
0 ◯◯◯ ◯◯◯ ◯◯◯ ◯◯◯

DNS SERVER (SECONDARY)

NETWORK SETTING ORDER SHEET (WIRELESS LAN)
(MARK AN APPLICABLE PART)

COMMUNICATION MODE
◯ INFRASTRUCTURE MODE       ◯ AD HOC MODE

SSID
[ ][ ][ ][ ][ ][ ][ ][ ][ ][ ][ ][ ][ ]
[ ][ ][ ][ ][ ][ ][ ][ ][ ][ ][ ][ ][ ]
[ ][ ][ ][ ][ ][ ][ ][ ]

ENCRYPTION
◯ WEP    ◯ WPA    ◯ OFF

KEY CHARACTER STRING
[ ][ ][ ][ ][ ][ ][ ][ ][ ][ ][ ][ ][ ]
[ ][ ][ ][ ][ ][ ][ ][ ][ ][ ][ ][ ][ ]
[ ][ ]

FIG. 7

NETWORK SETTING ORDER SHEET (BLUETOOTH™)
(MARK AN APPLICABLE PART)

BODY NUMBER
○ 0  ○ 1  ○ 2  ○ 3  ○ 4
○ 5  ○ 6  ○ 7  ○ 8  ○ 9

COMMUNICATION MODE
○ PUBRIC    ○ PRIVATE    ○ BONDING

ENCRYPTION
○ ON    ○ OFF

PASS KEY

IMAGE INPUT DEVICE, IMAGE INPUT/OUTPUT DEVICE AND METHOD OF SETTING INFORMATION FOR COMMUNICATION

BACKGROUND OF THE INVENTION

The present invention relates to an image input device and an image input/output device which have a network communicating function such as an LAN communication or a peer-to-peer communication, and a method of setting a parameter value for a communication.

There has been proposed a printer which can be connected to an IP (Internet Protocol) network (for example, JP-A-2004-78392 (FIG.1)).

In the case in which a network device connected to the IP network usually carries out a communication based on the IP, an IP address capable of identifying the network device in the network is required. The value of setting parameter such as the IP address is input by the operation of an operating unit in the network device or is assigned from a DHCP (Dynamic Host Configuration Protocol) server.

However, a device for inputting and/or outputting an image, for example, a composite machine having the function of a printer, a scanner or both of them is rarely provided with an operating unit requiring a comparatively large space on a housing, for example, a keyboard or a ten key which can input alphabets and numerals. In the case in which the value of setting parameter such as an IP address is input by operating a simple operating unit, therefore, a complicated work is performed. In the case in which the value of the setting parameter is acquired from a DHCP server, moreover, it is necessary to install a DHCP server program in another network device. If another network device is not present, moreover, it is hard to carry out a communication through a network. For example, in recent years, a printer having a composite function such as a scanner function has a model capable of directly executing a printing operation by means of a digital still camera even if a personal computer is not present.

SUMMARY

It is an advantage of the invention to obtain an image input device, an image input/output device and a method of setting a parameter value for a communication, which can set the value of setting parameter for a network communication without executing a complicated operation by a simple operating unit in a self-machine.

In order to accomplish the above advantage, the invention has the following structure, a device comprising:

a reader adapted to optically read contents described on a medium as an image and converting the image into image data;

a network interface adapted to be connected to a network;

a communicator communicating data with a mating device through the network interface in accordance with setting information of a prescribed protocol;

an acquirer acquiring the setting information from the image data; and a setter setting the acquired setting information to the communicator.

Consequently, the setting information of the protocol is set in accordance with the contents described on the medium by a user. Therefore, it is also possible to set the value of the setting parameter of the network communication without carrying out a complicated operation by a simple operating unit in a self-machine.

Moreover, the device according to the invention may have the following structure in addition to the device described above. More specifically, the acquirer acquires at least one of the setting information including parameter of use/nonuse of a dynamic host configuration protocol, an IP address of the devise, a subnet mask, an IP address of a gateway, and an IP address of a DNS server.

Consequently, the setting information required in the node of the IP network is set in accordance with the contents described on the medium by the user. Therefore, it is also possible to set the setting information of the communication in an IP network without carrying out a complicated operation by a simple operating unit in a self-machine.

Furthermore, the device according to the invention may have the following structure in addition to the device described above. More specifically, the communicator communicating with the mating device by using a wireless LAN, and the acquirer acquiring at least one of the setting information including a WEP key and SSID.

Consequently, the setting information of the wireless LAN is set in accordance with the contents described on the medium by the user. Therefore, it is possible to set the setting information of the communication in the wireless LAN by a simple operating unit in a self-machine.

Moreover, the device according to the invention may have the following structure in addition to the device described above. More specifically, the contents described on the medium include an identifier, the acquirer specifies the setting information from image data of the identifier, and the acquirer acquires the setting information from the image data of the contents based on the specified setting information.

Also in the case in which a plurality of media for specifying the setting information is required, consequently, any of the media which is to be used and any of the setting information which is to be set are clear. Thus, it is possible to prevent the setting information from being set erroneously.

Moreover, the device according to the invention may have the following structure in addition to the device described above. More specifically, the contents described on the medium include a plurality of paint-over patterns of paint-over segments according to a character including a numeral or an alphabet in a segment paint-over type form, the acquirer specifies the character from the paint-over pattern, and the acquirer decides the character to be the setting information.

By arranging mark fields corresponding to the number of choices (for example, the number of numerals of 0 to 9 and alphabets of A to Z and a to z), consequently, it is possible to decrease the occupied area of the form on the medium. In the case in which the number of the setting information is large, it is possible to decrease the number of media to be read.

Moreover, the device according to the invention may have the following structure in addition to the device described above. More specifically, the device further comprises a printer operable to print a form in which the contents are to be described on a medium.

Consequently, the form can be printed on the medium in the self-machine. If there is a plain printing paper, therefore, it is not necessary to separately prepare a special medium for an entry.

Furthermore, the device according to the invention may have the following structure in addition to the device described above. More specifically, the printer prints an identifier indicative of the setting information on the medium when printing the form on the medium.

Also in the case in which a plurality of media for specifying the setting information is required, consequently, any of the media which is to be used and any of the setting information which is to be set are clear. Thus, it is possible to prevent the setting information from being set erroneously.

Furthermore, the device according to the invention may have the following structure in addition to the device described above. More specifically, the printer prints a list for the setting information on a medium after the setter sets the setting information to the communicator.

Consequently, the user can confirm the setting information set by using the medium. Thus, it is possible to suppress the erroneous setting of the setting information.

Moreover, the device according to the invention may have the following structure in addition to the device described above. More specifically, the device further comprises a verifier verifying an availability of communication by the communicator in accordance with the setting information of the prescribed protocol or an upper protocol thereof after the setter sets the setting information to the communicator, and the printer prints a result of the verification obtained by the verifier.

Consequently, the user can ascertain whether or not the setting information set by using the medium is proper. Thus, it is possible to suppress the erroneous setting of the value of the setting parameter.

Furthermore, the device according to the invention may have the following structure in addition to the device described above. More specifically, the printer prints a list for the setting information being set at the present time on the medium or another medium when printing the form on the medium.

Consequently, the user can refer to the setting information at the present time. Thus, it is possible to suppress a possibility of the error of the setting information at time of setting to be carried out by the medium.

Moreover, the device according to the invention may have the following structure in addition to any of the device described above. More specifically, the form includes a plurality of paint-over segments capable of specifying a numeral or an alphabet from a paint-over pattern of the paint-over segment.

By arranging mark fields corresponding to the number of choices (the number of numerals of 0 to 9 and alphabets of A to Z and a to z), consequently, it is possible to decrease the occupied area of the form on the medium. In the case in which the number of the setting information is large, it is possible to decrease the number of media to be read.

Moreover, the device according to the invention may have the following structure in addition to the device described above. More specifically, the printer prints the form together with the setting information being set at the present time and descried in the form on a medium.

When the device is reset to an initial condition such as a factory shipping state, consequently, the setting information is set by using a medium in which current setting information is printed on the form. Thus, it is possible to easily carry out a return to the same setting as before.

A method of setting setting information to a communicator of a device, the device adapted to be connected to a network and including the communicator communicating data with a mating device through the network in accordance with the setting information, the method comprising:

optically reading contents described on a medium;
converting the contents into image data;
acquiring the setting information from the image data; and
setting the setting information to the communicator.

Consequently, the setting information is set in accordance with the contents described on the medium by a user. Therefore, it is also possible to set the setting information of the network communication without carrying out a complicated operation by a simple operating unit in a self-machine.

BRIEF DESCRIPTION OF THE DRAWINGS

FIG. 3 is a diagram showing an example of an order sheet according to the first embodiment, FIG. 4 is a diagram showing an example of the order sheet according to the first embodiment, FIG. 5 is a diagram showing an example of an entry in the order sheet illustrated in FIG. 3, FIG. 6 is a diagram showing an example of an order sheet for a wireless LAN according to the first embodiment, FIG. 7 is a diagram showing an example of an order sheet for Blue Tooth (trademark) according to the first embodiment, FIG. 8 is a diagram showing an example of an order sheet according to a second embodiment, and FIG. 9 is a diagram showing an example of an order sheet according to a third embodiment.

DETAIL DESCRIPTION OF PREFERRED EMBODIMENTS

Embodiments according to the invention will be described below with reference to the drawings.

First Embodiment

Figure 1:
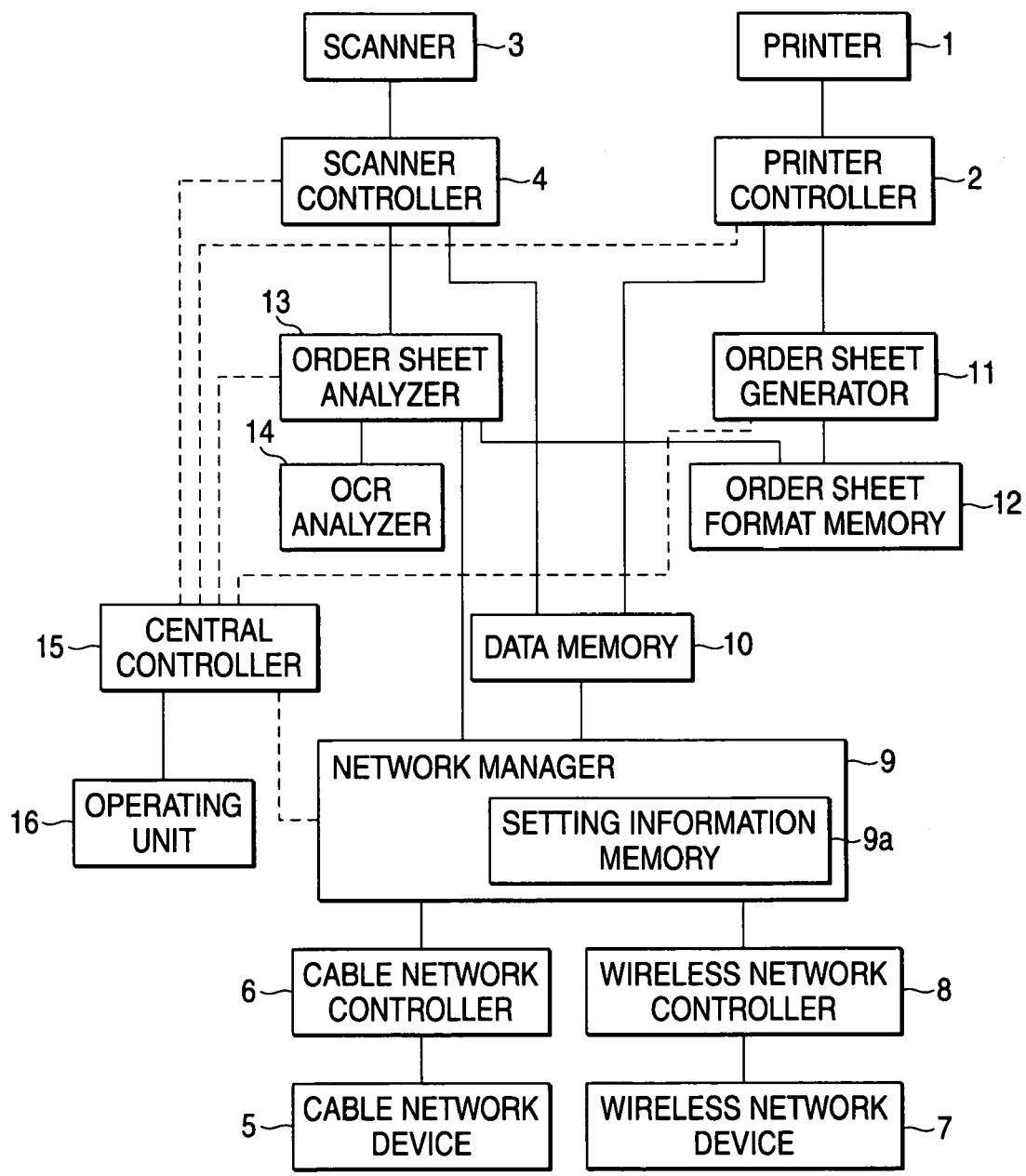
FIG. 1 is a block diagram showing the structure of an image input/output device according to a first embodiment.

The image input/output device shown in FIG. 1 is a composite machine having a scanner function and a printer function. In FIG. 1, a printer 1 is a mechanism for printing a character and an image on a medium such as a printing paper, and has a feeding mechanism for feeding, discharging and delivering the medium and a fixing mechanism for fixing a pigment such as an ink or a toner to the surface of the medium. In the case in which the printer 1 is an ink jet printer, the fixing mechanism includes an ink ejecting head and a head driving mechanism. Moreover, a printer controller 2 serves to control each mechanism in the printer 1 corresponding to a printing command, thereby forming an image such as a character on the medium such as the printing paper. The printer controller 2 is constituted by a microprocessor including a program and/or a dedicated electronic circuit. The printer 1 and the printer controller 2 print a character and an image on the medium such as the printing paper.

Moreover, a scanner 3 has a light projecting unit for projecting a light onto a medium, an imaging unit for detecting a light reflected from the medium, and a feeding mechanism for feeding the medium or the imaging unit. In case of a device of a flat head type, the medium is disposed on a transparent text table and the imaging unit is fed by the feeding mechanism. In case of a device of an ADF (Auto Document Feeder) type, the medium is fed by the feeding mechanism. A scanner controller 4 serves to control each mechanism in the scanner 3 in response to a control signal, to acquire an electric signal corresponding to an image described on the medium from the imaging unit and to output the electric signal as image data. The scanner controller 4 is constituted by a microprocessor including a program and/or a dedicated electronic circuit. The scanner 3 and the scanner controller 4 optically read the contents described on the medium as an image, and convert the image into data.

Moreover, a cable network device 5 is an interface circuit including a physical layer for communicating an electric signal through a communication cable like an Ethernet (registered trademark), for example. A cable network controller 6 serves to control the cable network device 5 and to communicate data in accordance with a communication protocol belonging to an upper hierarchy than the physical layer. The cable network controller 6 is constituted by a microprocessor including a program and/or a dedicated electronic circuit. The cable network device 5 is connected to a network by a cable, and furthermore, the cable network controller 6 carries out a communication in a predetermined communication protocol through the cable network device 5.

Moreover, a wireless network device 7 is an interface circuit including a physical layer for communicating a signal by wireless (a radio wave or infrared rays). A wireless network controller 8 serves to control the wireless network device 7 to establish a wireless channel and to communicate data in the upper hierarchy than the physical layer through the wireless cannel. The wireless network controller 8 is constituted by a microprocessor including a program and/or a dedicated electronic circuit. The wireless network device 7 is connected to a network by wireless, and furthermore, the wireless network controller 8 carries out a communication in a predetermined communication protocol through the wireless network device 7.

In addition, a network manager 9 stores, in a setting information memory 9a to be a nonvolatile memory, a value of setting parameter for a communication protocol to be used in the cable network controller 6 and/or the wireless network controller 8, and sets the value of the setting parameter to the cable network controller 6 and/or the wireless network controller 8. The network manager 9 is constituted by a microprocessor including a program and/or a dedicated electronic circuit.

Moreover, a data memory 10 serves to temporarily store data to be used in printing and image data obtained from the scanner 3 and the scanner controller 4. The data memory 10 is constituted by an RAM (Random Access Memory), for example. These data are input from or output to other devices through the cable network device 5 or the wireless network device 7.

Furthermore, an order sheet generator 11 is a data processor for generating data (for example, a print command) to print an order sheet in which a user enters the value of the setting parameter to be used in the cable network controller 6 and/or the wireless network controller 8. In particular, the order sheet generator 11 is a data processor for generating data to carry out printing over an order sheet corresponding to the type of the setting parameter to be a setting object. The order sheet is also referred to as a paper for a template to enter the setting parameter value.

In addition, an order sheet format memory 12 serves to store information about the format of each order sheet corresponding to the type of the setting parameter to be the setting object. The order sheet format memory 12 is constituted by a nonvolatile memory. Moreover, the information about the format of the order sheet implies information about an entry field indicating a correspondence between the order sheet and the setting parameter having a value to be entered in the order sheet, the type of an entry field for each setting parameter (a choice mark field or a character entry frame), and a position thereof. The choice mark field implies an elliptical or rectangular field for paint-over, which is provided corresponding to each of the choices of the setting value. The information about the format includes a correspondence between data on the choice and the position of the field for paint-over (the mark field). Moreover, a character entry frame implies a frame in which numerals or alphabets are entered by handwriting.

Moreover, an order sheet analyzer 13 carries out an image processing over image data indicative of the contents described on the medium which are read by the scanner 3 and the scanner controller 4, and acquires the value of the setting parameter of a communication protocol in the cable network controller 6 and/or the wireless network controller 8 from the contents described on the medium. The order sheet analyzer 13 is constituted by a microprocessor including a program and/or a dedicated electronic circuit. In particular, the order sheet analyzer 13 specifies the type and the position of the entry field for each setting parameter by referring to the information about a format in the order sheet format memory 12, and specifies the value of each setting parameter entered by a user based on an image in the entry field. An OCR analyzer 14 is a data processor based on an OCR (Optical Character Recognition) technique for specifying a numeral and/or an alphabet included as an image from certain image data.

For example, in the case in which an entry field for a certain setting parameter is an array of the choice mark fields, the order sheet analyzer 13 specifies a choice mark field painted over based on the luminance value of an image in each choice mark field and causes a value corresponding to the choice mark field to be the value of the setting parameter.

In the case in which the entry field for a certain setting parameter is an entry frame for a numeral having a predetermined digit number, for example, the order sheet analyzer 13 specifies an entered numeral (one character) from an image in an entry frame for each digit by the OCR analyzer 14 and causes the numeral having a predetermined digit number thus specified to be the value of the setting parameter.

In the case in which the entry field for a certain setting parameter is an entry frame for a numeral or an alphabet having a predetermined number of characters, for example, the order sheet analyzer 13 specifies a entered character (one character) from an image in an entry frame for each digit by the OCR analyzer 14 and causes a character string having a predetermined number of characters thus specified to be the value of the setting parameter.

Furthermore, a central controller 15 serves to control each unit in the image input/output device and to start or stop the operation of each unit. The central controller 15 is constituted by a microprocessor including a program and/or a dedicated electronic circuit.

In addition, an operating unit 16 is a simple operating unit having only operation buttons such as a power switch, a print start button and a print stop button which are provided on the housing of the image input/output device and an arrow button for selecting the items of a display menu in a small-sized liquid crystal monitor on the housing which is not shown. In other words, the operating unit 16 is not provided with operating units for directly inputting numerals or alphabets one by one by a one-time pressing operation, for example, a ten key and a keyboard for inputting the alphabets.

Figure 2:
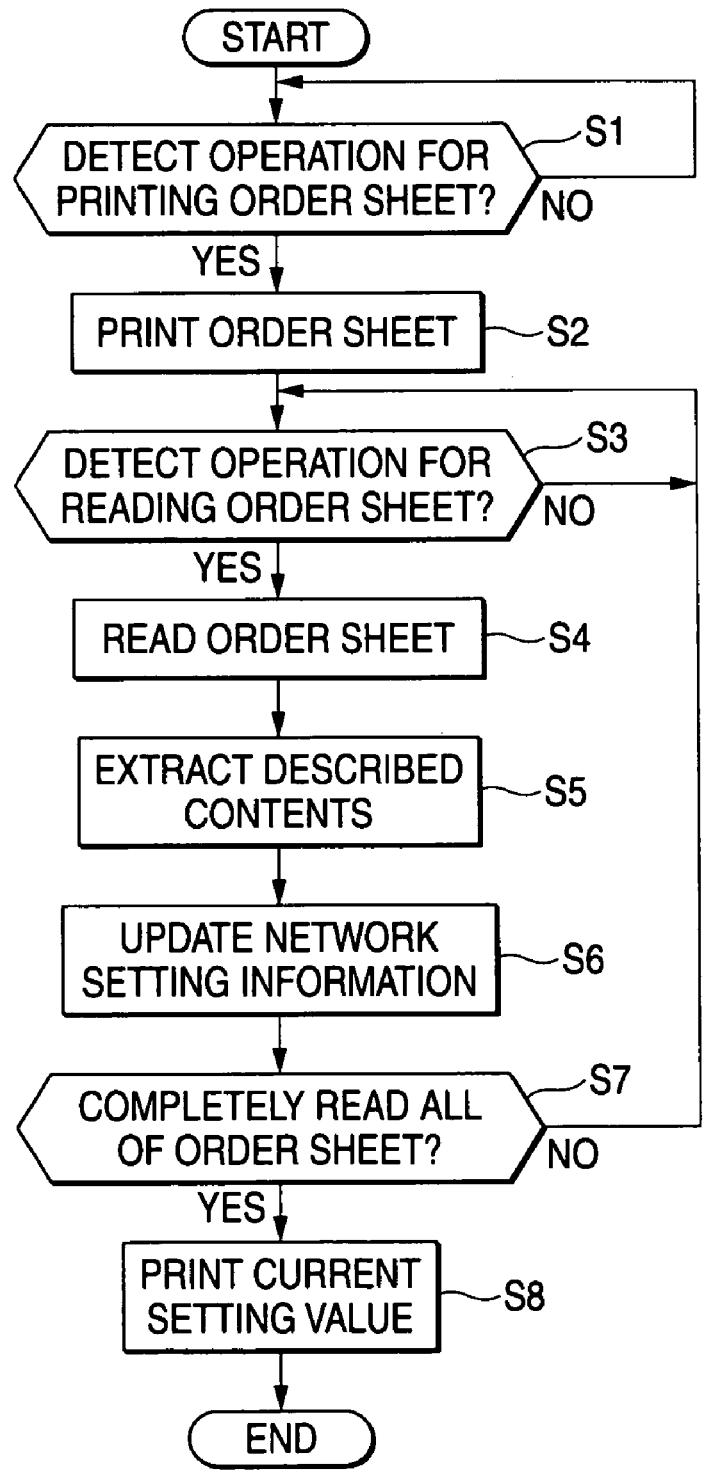
FIG. 2 is a flowchart showing the operation of the image input/output device according to the first embodiment.

Next, the operation of the device will be described. FIG. 2 is a flowchart for explaining an operation to be carried out when setting setting parameter for a communication in the image input/output device according to the first embodiment.

First of all, when the operating unit 16 is operated to give a command for carrying out printing over a network setting order sheet, the central controller 15 detects the operation and supplies the command for carrying out printing over the network setting order sheet to the order sheet generator 11 (Step S1).

The order sheet generator 11 specifies the format of an order sheet by referring to the order sheet format memory 12 and supplies print data corresponding thereto to the printer controller 2. The printer controller 2 controls the printer 1 based on the print data and prints an entry field on a medium such as a printing paper (Step S2). Consequently, an order sheet having the entry field printed on the medium is generated.

FIGS. 3 and 4 are diagrams showing an example of the order sheet subjected to the printing by the image input/output device according to the first embodiment. The order sheet shown in FIG. 3 serves to specify the values of parameter indicating whether DHCP is used, an IP address of the device, a subnet mask and an IP address of a gateway. In the order sheet, an entry field as to whether the DHCP is used is indicated as a choice mark field 51, and an entry field for each of the IP address of the device, the subnet mask and the IP address of the gateway is indicated as a numeral entry frame 52 corresponding to a numeral for 12 digits and an array 53 of a choice mark field for selecting the numeral.

Moreover, the order sheet shown in FIG. 4 serves to specify the values of parameter as to whether DNS is set automatically or manually, an IP address of a primary DNS server and an IP address of a secondary DNS server. In the order sheet, an entry field as to whether the DNS is set automatically is indicated as a choice mark field 54, and an entry field for the IP address of the DNS server is indicated as a numeral entry frame 55 corresponding to a numeral for 12 digits and an array 56 of a choice mark field for selecting the numeral.

In the first embodiment, for example, the entry fields shown in FIG. 3 and the entry fields shown in FIG. 4 are printed on two printing papers respectively so that two order sheets are generated.

Then, a user enters the setting values into the two order sheets. In case of the order sheet shown in FIG. 3, first of all, either of choice mark fields for "IP address automatic setting" and "IP address manual setting" is painted over with a pencil or a pen. In the case in which the "IP address manual setting" is specified, furthermore, numerals are further entered into four sets of three-digit numeral entry frames by handwriting for the "IP address" and choice mark fields corresponding to any of numerals of 0 to 9 arranged on the underside of each entry frame are painted over. Moreover, the entry is carried out in the same manner for "subnet mask" and "default gateway". In the case in which the "IP address automatic setting" is specified, the IP address is assigned from a host device such as a DHCP server, having an IP address managing function.

Figure 5:
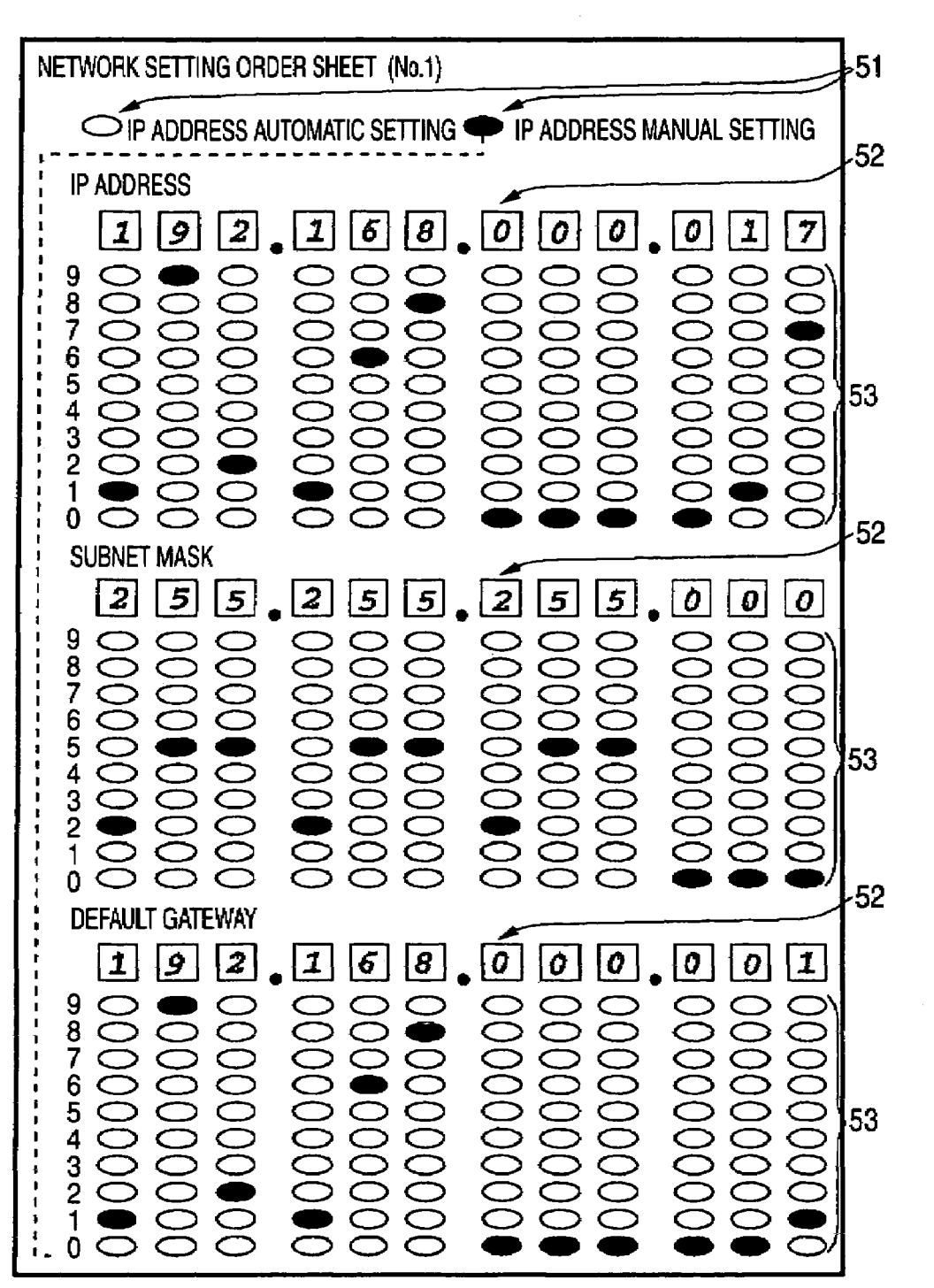

FIG. 5 is a diagram showing an example of the entry of the order sheet illustrated in FIG. 3. In the entered order sheet shown in FIG. 5, first of all, "IP address manual setting" is selected, and "192.168.000.017" is specified as the IP address of a self-machine for the "IP address", "255.255.255.000" is specified for the "subnet mask", and "192.168.000.001" is specified for the "default gateway".

In case of the order sheet shown in FIG. 4, first of all, either of choice mark fields for "DNS automatic setting" and "DNS manual setting" is painted over with a pencil or a pen. In the case in which the "DNS manual setting" is specified, the IP address of a primary DNS server is entered in the same manner as the "IP address" in FIG. 3 for "DNS server (primary)" and the IP address of a secondary DNS server is entered in the same manner for "DNS server (secondary)".

In the case in which the communication protocol of the wireless network controller 8 is a wireless LAN (for example, an IEEE 802.11 system), furthermore, an order sheet for setting parameter of the wireless LAN is generated in the same manner. FIG. 6 is a diagram showing an example of the order sheet for the wireless LAN which is subjected to the printing by the image input/output device according to the first embodiment. The order sheet shown in FIG. 6 serves to specify a communication mode, SSID (Service Set Identifier) of a group belonging to the device, an encryption method, and a value of a key character string to be used for generating the key of the encryption. In the order sheet, an entry field for the parameter of the communication mode is indicated as choice mark fields for "infrastructure mode" and "ad hoc mode", an entry field for the SSID is indicated as a character entry frame corresponding to 32 characters, an entry field for the encryption method is indicated as choice mark fields for "WEP", "WPA" and "OFF", and an entry field for a key character string is indicated as a character entry frame corresponding to 26 characters. WEP (Wired Equivalent Privacy) is one of the encryption methods based on a secret key. Moreover, WPA (Wi-Fi Protected Access) is one of the encryption methods having a use authenticating function and a key update function.

In the case in which the communication protocol of the wireless network controller 8 is Blue Tooth (trademark), moreover, an order sheet for the setting parameter of the Blue Tooth (trademark) is generated in the same manner. FIG. 7 is a diagram showing an example of the order sheet for the Blue Tooth (trademark) printed by the image input/output device according to the first embodiment. The order sheet shown in FIG. 7 serves to specify a body number, a communication mode, ON/OFF of encryption and a value of a pass key. In the order sheet, an entry field for the body number is indicated as a choice mark field of 0 to 9, an entry field for the communication mode is indicated as a choice mark field for "public", "private" and "bonding", an entry field for the ON/OFF of the encryption is indicated as a choice mark field for "ON" and "OFF", and an entry field for the pass key is indicated as a character entry frame corresponding to four characters.

Thus, an order sheet corresponding to the type of a network communicating function mounted on the image input/output device is generated by printing the entry fields on a medium such as a printing paper.

When the order sheet subjected to the entry is set into the scanner 3 by a user and a reading operation is carried out for the operating unit 16, the central controller 15 detects the operation and supplies a reading command to the scanner controller 4 (Step S3).

The scanner controller 4 controls the scanner 3 upon receipt of the reading command, and supplies read image data to the order sheet analyzer 13 (Step S4). Consequently, the image data of the order sheet subjected to the entry are supplied to the order sheet analyzer 13.

The order sheet analyzer 13 reads information about a format for each order sheet from the order sheet format memory 12 and first specifies the type of setting parameter in each order sheet, specifies the type and the position of an entry field for the setting parameter, and specifies the value of the setting parameter entered by the user based on an image in the entry field (Step S5). At that time, a value corresponding to the marked choice mark field is set to be the value of the setting parameter in case of the choice mark field, and at least one character specified by image data in a frame by the OCR analyzer 14 is set to be the value of the setting parameter in case of at least one character entry frame. Then, the order sheet analyzer 13 supplies a value specified for each setting parameter to the network manager 9.

For example, in case of the order sheet subjected to the entry shown in FIG. 5, "IP address manual setting" is first selected and a right one of the two choice mark fields 51 is painted over. Therefore, the order sheet analyzer 13 acquires "OFF" as the value of the ON/OFF setting parameter of the DHCP. Referring to the IP address, moreover, the order sheet analyzer 13 specifies a numeral for each digit (any of 0 to 9) from the position of the choice mark field painted over in the array 53 of the choice mark fields corresponding to each digit such as the IP address.

The network manager 9 stores, in the setting information memory 9a, the value specified by the order sheet analyzer 13 for each setting parameter, and furthermore, sets the value to the cable network controller 6 and/or the wireless network controller 8 (Step S6). In the case in which any value stored in the setting information memory 9a is present for the setting parameter, the value is updated with the value specified by the order sheet analyzer 13. In the case in which the value of the setting parameter is acquired from the order sheet shown in FIG. 5, DHCP OFF, 192.168.000.001, 255.255.255.000 and 192.168.000.001 are set to be the values of the setting parameters, for example, the ON/OFF parameter of the DHCP, the self-machine IP address, the subnet mask, and the IP address of the default gateway.

By a series of processings from the Step S3 to the Step S6, thus, the value of the setting parameter is extracted from one order sheet and is reflected in the setting value(s) of the cable network controller 6 and/or the wireless network controller 8.

Thereafter, a series of processings from the Step S3 to Step S7 are executed for each order sheet until the values of the setting parameters for all of the order sheets generated at the Step S2 are completely read and extracted or the operating unit 16 carries out a predetermined stop operation.

In the case in which the values of the setting parameters for all of the order sheets generated at the Step S2 are completely read and extracted or the case in which the operating unit 16 carries out the predetermined stop operation, the central controller 15 reads the values of all of the setting parameters in the cable network controller 6 and the wireless network controller 8 from the setting information memory 9a of the network manager 9, supplies the values of the setting parameters to the printer controller 2, and causes the printer 1 to print the values of the setting parameters (Step S8).

As described above, according to the first embodiment, the order sheet analyzer 13 carries out an image processing and acquires the value of the setting parameter of a communication protocol from the contents described on the order sheet which are read by the scanner 3 and the scanner control potion 4, and the network manager 9 sets the value of the setting parameter to the cable network controller 6 and/or the wireless network controller 8.

Consequently, the value of the setting parameter of the communication protocol is set in accordance with the contents described on the medium by the user. Therefore, a simple operating unit can also set the value of the setting parameter of a network communication without carrying out a complicated operation in a self-machine. In the first embodiment, moreover, it is possible to print the entry field on the medium, thereby generating the order sheet in the self-machine. If there is a plain printing paper, therefore, it is not necessary to separately prepare a dedicated medium for an entry.

According to the first embodiment, moreover, the order sheet analyzer 13 acquires the value of at least one of the setting parameters including parameter indicating whether a dynamic host configuration protocol is used, an IP address of the device, a subnet mask, an IP address of a gateway, and an IP address of a DNS server. Consequently, the value of the setting parameter required for the node of the IP network is set in accordance with the contents described on the medium by the user. Therefore, it is possible to set the value of the setting parameter for the communication in the IP network without carrying out a complicated operation.

According to the first embodiment, moreover, the order sheet analyzer 13 acquires the value of at least one of the setting parameters including a WEP key and SSID. Consequently, the value of the setting parameter of the wireless LAN is set in accordance with the contents described on the medium by the user. Therefore, it is possible to set the value of the setting parameter of the communication in the wireless LAN without carrying out a complicated operation.

According to the first embodiment, furthermore, the printer 1 and the printer controller 2 print a list for the values of the setting parameters of the communication protocol to be used by the network controllers 6 and 8 after the values of the setting parameters are set by the network manager 9. Consequently, the user can confirm the value of the setting parameter of the communication protocol which is set by using the medium, thereby preventing the value of the setting parameter from being set erroneously.

Second Embodiment

An image input/output device according to a second embodiment of the invention prints a segment paint-over type entry field capable of painting over at least two of seven segments in a predetermined pattern to select numerals of 0 to 9, thereby generating an order sheet, and acquires the value of setting parameter desired by a user based on the image of an order sheet subjected to an entry for the segment paint-over type entry field and sets the value of the setting parameter to a cable network controller 6 and a wireless network controller 8.

Since the operation and structure of the image input/output device according to the second embodiment is the same as that in the first embodiment except for the print of an entry field on a medium and the acquirement of the value of setting parameter from the order sheet (that is, the medium), description thereof will be omitted.

Next, description will be given to the print of an entry field on a medium and the acquirement of the value of setting parameter from an order sheet (that is, the medium) according to the second embodiment.

Figure 8:
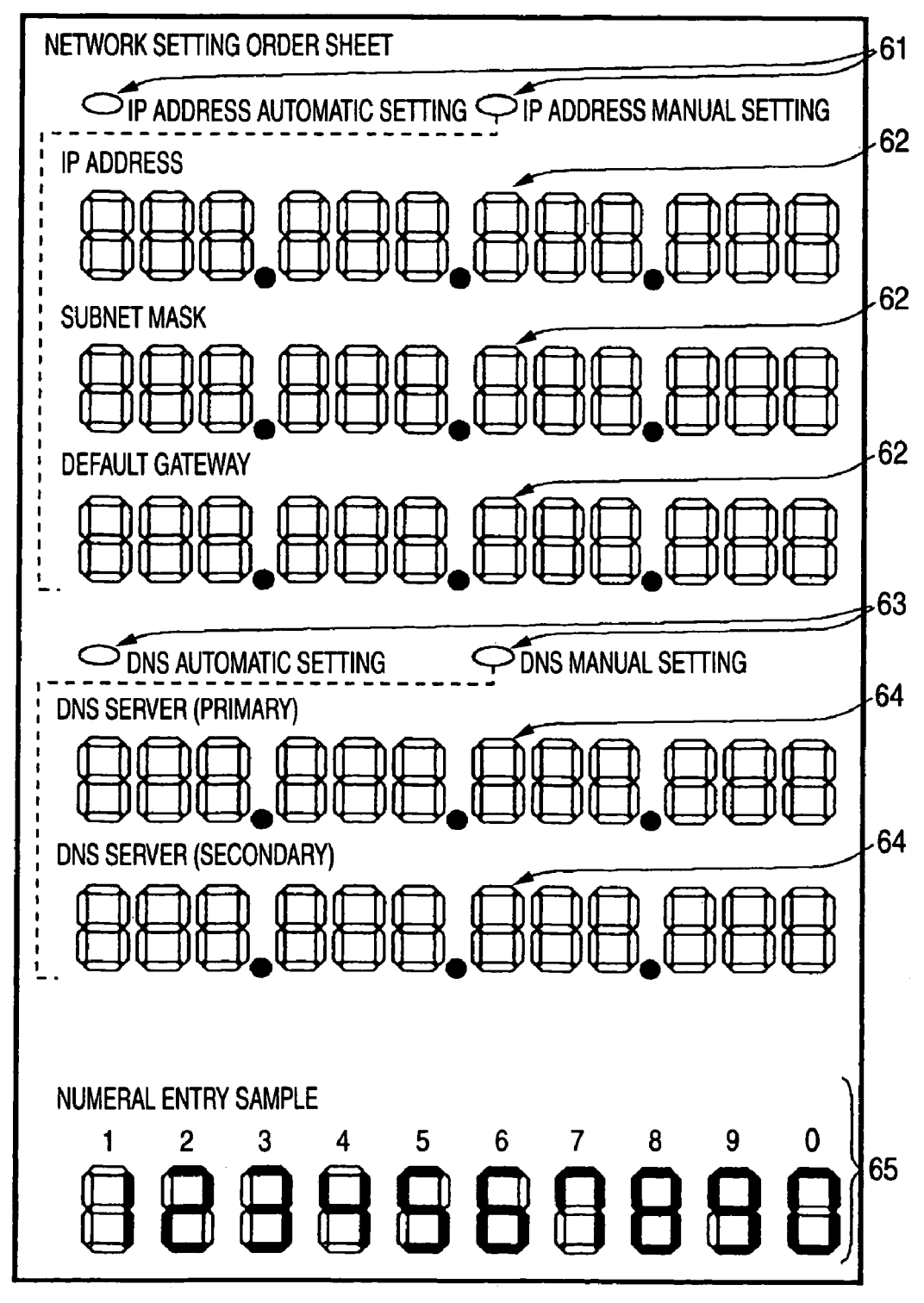

FIG. 8 is a diagram showing an example of an order sheet printed by the image input/output device according to the second embodiment. The order sheet shown in FIG. 8 serves to specify the values of parameter as to whether DHCP is used, an IP address of the device, a subnet mask, an IP address of a gateway, parameter as to whether DNS is set automatically or manually, an IP address of a primary DNS server, and an IP address of a secondary DNS server. In the order sheet, an entry field as to whether the DHCP is used is indicated as a choice mark field 61, and an entry field for each of the IP address of the device, the subnet mask, and the IP address of the gateway is indicated as a segment paint-over type entry field 62 corresponding to a numeral having 12 digits. In the order sheet, moreover, an entry field as to whether the DNS is set automatically is indicated as a choice mark field 63, and an entry field for the IP address of the DNS server is indicated as a segment paint-over type entry field 64 corresponding to the numeral having 12 digits. The segment paint-over type entry field is constituted by seven segments for representing the configuration of the numerals.

In the image input/output device according to the second embodiment, moreover, a numeral entry sample 65 for the segment paint-over type entry field is printed together with the entry field by a printer 1 and a printer controller 2. For the entry sample, the numeral and the segment paint-over type entry field which is painted over corresponding to the numeral are printed together for the numerals of 0 to 9. A correspondence between a paint-over pattern corresponding to each numeral and a numeral corresponding thereto is prestored as information about a format of the order sheet in an order sheet format memory 12, and an order sheet generator 11 causes the printer controller 2 to print the entry sample on a medium based thereon.

A user paints over a pertinent segment for specifying a desirable numeral in accordance with the entry sample.

Then, an order sheet analyzer 13 first specifies the position of each segment in a segment paint-over type entry field on an image which is read, specifies a segment paint-over pattern, and decides any of the numerals of 0 to 9 which is caused to correspond to the pattern as a numeral entered in the segment paint-over type entry field. A correspondence between the paint-over pattern and the numeral corresponding thereto is identical to that of the entry sample on the order sheet. The order sheet analyzer 13 acquires information about the correspondence between the paint-over pattern and the numeral corresponding thereto from the entry sample printed on the order sheet or the information about the format of the order sheet in the order sheet format memory 12, and decides the type of the numeral based thereon.

Thus, the numeral having 12 digits is acquired as the values of the IP address and the subnet mask. Then, the value of each setting parameter is stored by a network manager 9, and furthermore, is set to the network controllers 6 and 8.

As described above, according to the second embodiment, the printer 1 and the printer controller 2 print a segment paint-over type entry field constituted by a plurality of paint-over segments capable of specifying the numeral from the paint-over pattern corresponding to a predetermined number of characters when printing the entry field for the value of the setting parameter of the communication protocol on the medium. According to the second embodiment, moreover, the order sheet analyzer 13 specifies a numeral to be a character from the paint-over segment pattern which is painted over in the segment paint-over type entry field in the read medium, and sets at least one numeral specified from an image in at least one segment paint-over type entry field to be the value of the setting parameter of the communication protocol.

By arranging mark fields corresponding to the number of choices (the number of the numerals of 0 to 9=ten) for each digit in a numeral string, consequently, it is possible to decrease the occupied area of the entry field on the medium. In the case in which the number of the setting parameters is large, it is possible to decrease the number of the media to be read.

In the case in which five entry fields for the IP address of the device, the subnet mask, the IP address of a gateway, the IP address of a primary DNS server, and the IP address of a secondary DNS server are to be printed, particularly, it is possible to generate an order sheet by one A4 printing paper as shown in FIG. 8, for example, by using the segment paint-over type entry field as in the second embodiment.

Third Embodiment

An image input/output device according to a third embodiment of the invention combines segment paint-over type entry fields for nine segments with choice mark fields for the capital and small letters of alphabets and numerals, thereby printing a segment paint-over type entry field having a choice mark field which can specify any of capital letters (A to Z) and small letters (a to z) of the alphabets and numerals (0 to 9) to generate an order sheet, and acquires the value of setting parameter desired by a user based on the image of the order sheet subjected to an entry for the segment paint-over type entry field having a choice mark field and sets the value of the setting parameter to a cable network controller 6 and/or a wireless network controller 8.

Since the operation and structure of the image input/output device according to the third embodiment is the same as that in the first embodiment except for the print of an entry field on a medium and the acquirement of the value of setting parameter from the order sheet (that is, the medium), description thereof will be omitted.

Next, description will be given to the print of the entry field on the medium and the acquirement of the value of the setting parameter from the order sheet (that is, the medium) according to the third embodiment.

Figure 9:
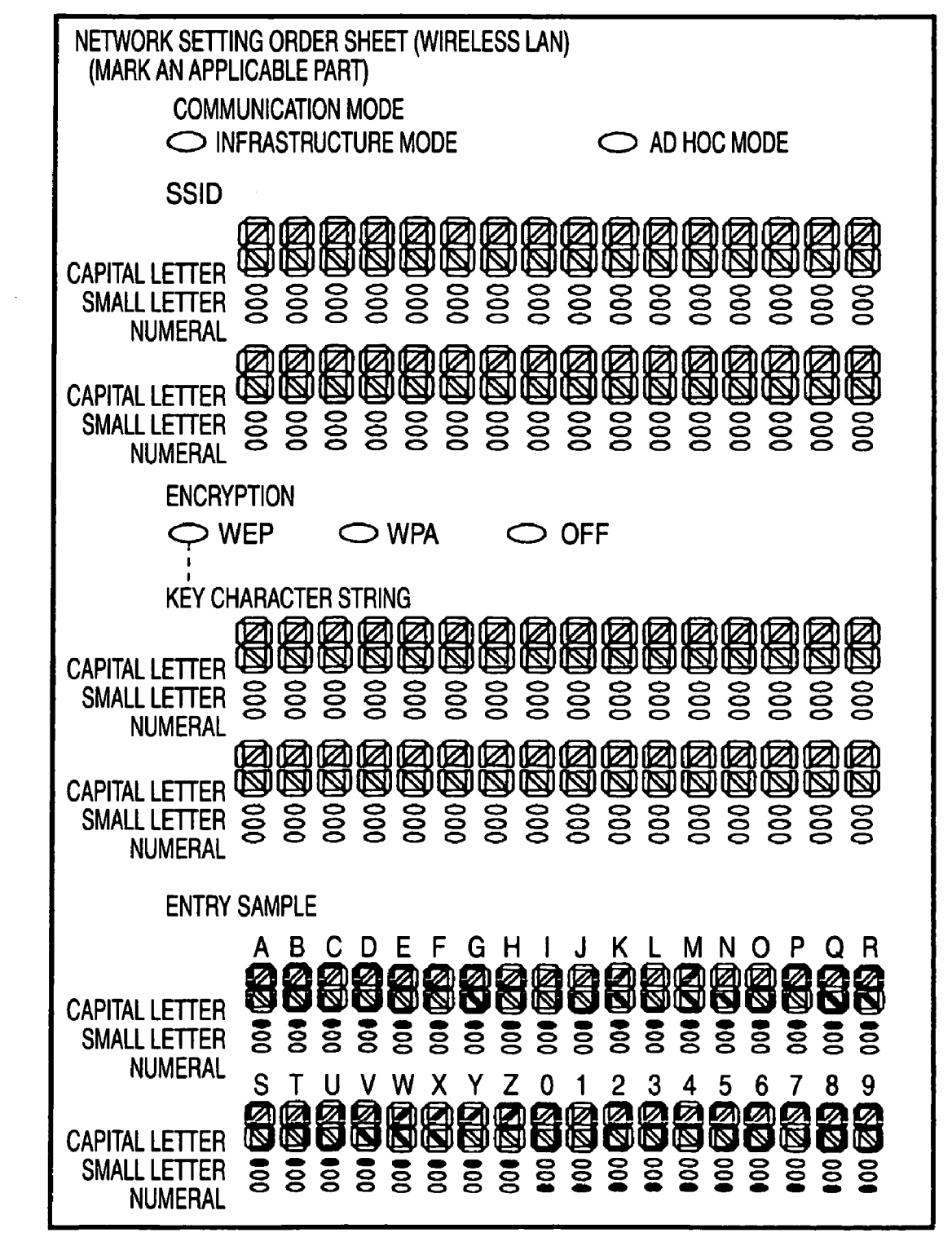

FIG. 9 is a diagram showing an example of an order sheet printed by the image input/output device according to the third embodiment. The order sheet shown in FIG. 9 is an order sheet for the setting parameter of a wireless LAN. The order sheet shown in FIG. 9 serves to specify a communication mode, SSID of a group to which the device belongs, an encryption method, and the value of a key character string to be used for generating a key for the encryption. In the order sheet, an entry field for the parameter of the communication mode is indicated as a choice mark field for "infrastructure mode" and "ad hoc mode", an entry field for the SSID is indicated as a segment paint-over type entry field having choice mark fields corresponding to 32 characters, an entry field for the encryption method is indicated as a choice mark field for "WEP", "WPA" and "OFF", and an entry field for the key character string is indicated as a segment paint-over type entry field having choice mark fields corresponding to 26 characters. The segment paint-over type entry field having choice mark fields is constituted by nine segments for representing the configuration of the alphabet or the numeral and three choice mark fields for selecting any of the capital and small letters of the alphabets and the numerals.

In the image input/output device according to the third embodiment, moreover, the entry sample of the numeral for the segment paint-over type entry field having choice mark fields is printed together with the entry field by a printer 1 and a printer controller 2. Referring to the entry sample, the alphabet or numeral and the pattern of a segment painted over corresponding to the alphabet or the numeral and a choice mark field are printed together for the alphabets of A to Z and the numerals of 0 to 9. A difference in the specification of the capital and small letters of the alphabets simply represents a difference between the paint-over positions of the choice mark fields. A paint-over pattern corresponding to each of the alphabets and the numerals is set to approximate to the shape of each character and is predetermined so as to be easily suggested by a user. In the example shown in FIG. 9, alphabets of M, T and W are set to have patterns taking close shapes to each other as seen in a transverse direction and an alphabet of X is set to have a pattern taking a shape representing a right half of X.

The user paints over a pertinent segment for specifying a desirable alphabet or numeral in accordance with the entry sample.

An order sheet analyzer 13 first specifies each choice mark field of a segment paint-over type entry field having a choice mark field and the position of a segment in an image which is read, specifies any of the three choice mark fields which is painted over and the paint-over pattern of the segment, and decides an alphabet or a numeral corresponding to the pattern to be an alphabet or a numeral which is entered in the entry field. A correspondence between the paint-over pattern (including the paint-over of the choice mark field) and the alphabet or numeral corresponding thereto is identical to that of the entry sample on the order sheet. The order sheet analyzer 13 acquires information about the correspondence between the paint-over pattern and the alphabet or numeral corresponding thereto from the entry sample printed on the order sheet or information about the format of the order sheet in an order sheet format memory 12, and decides the type of the alphabet or numeral based thereon.

Thus, it is possible to acquire the values of the SSID and the key character string in which the capital and small letters of the alphabet and the numerals can be used and the capital and small letters of the alphabets can be distinguished from each other. The value of each setting parameter is stored by a network manager 9 and is set to the wireless network controller 8.

As described above, according to the third embodiment, the printer 1 and the printer controller 2 print, corresponding to a predetermined number of characters, a segment paint-over type entry field constituted by a plurality of paint-over segments capable of specifying the alphabet from the paint-over pattern together with the choice mark field for selecting the character type (the capital letter of the alphabet, the small letter of the alphabet or the numeral) when printing the entry field of the value of the setting parameter of the communication protocol on the medium. Moreover, the order sheet analyzer 13 specifies the numeral or alphabet to be one character from the paint-over pattern of the paint-over segment and the choice mark field which is painted over, and sets at least one numeral and/or alphabet specified from an image in at least one entry field to be the value of the setting parameter of the communication protocol.

By arranging the mark fields corresponding to the number of choices for each character (the number of numerals of 0 to 9 and alphabets A to Z and a to z=62), consequently, it is possible to decrease the occupied area of the entry field on the medium. In the case in which the number of the setting parameters is large, it is possible to decrease the number of the media to be read.

Fourth Embodiment

While the devices according to the first to third embodiments are the image input/output devices, it is also possible to employ an image input device which does not have the printer 1, the printer controller 2 and the order sheet generator 11 in the components of the devices according to the first to third embodiments. In this case, an order sheet is packed together with the image input device and is thus prepared or is printed and generated by a printer which is not shown, for example. Since it is preferable that the contents entered in the order sheet should be read and the value of setting parameter should be acquired and set in the image input device in the same manner as in any of the first to third embodiments, description thereof will be omitted.

While each of the embodiments is a suitable example of the invention, the invention is not restricted thereto but various changes and modifications can be made without departing from the scope of the invention.

For example, in each of the embodiments, the order sheet generator 11 specifies the format of the order sheet by referring to the order sheet format memory 12, and generates print data corresponding thereto and supplies the print data to the printer controller 2. Instead, it is also possible to read print data corresponding to the type of setting parameter which are prestored in a predetermined storage medium and to supply the print data to the printer controller 2.

In each of the embodiments, moreover, the printer 1 and the printer controller 2 may print an identifier indicative of the type of setting parameter for printing an entry field on a medium (for example, a serial number, a bar code or QR Code (trademark)) together with the medium when printing the entry field for the value of the setting parameter of the communication protocol on the medium. In that case, the order sheet analyzer 13 may specify the type of the setting parameter described on the order sheet (the medium) from image data on the identifier described on the order sheet (the medium), thereby acquiring the value of the setting parameter of the communication protocol from the contents described on the order sheet (the medium) depending on the type of the setting parameter thus specified. Also in the case in which a plurality of media for specifying the value of the setting parameter is required, consequently, any of the media which is to be used and any of the values of the setting parameters which is to be set can be clear so that the value of the setting parameter can be prevented from being set erroneously.

In each of the embodiments, moreover, a communication may be carried out by a communication protocol or an upper protocol thereof after the value of the setting parameter of the communication protocol is set, and the network manager 9 may verify the possibility of a communication in the value of the setting parameter, thereby causing the printer controller 2 and the printer 1 to print the result of the verification.

In each of the embodiments, furthermore, the printer 1 and the printer controller 2 may print the list for the value of the setting parameter of the communication protocol stored in the setting information memory 9a as a list for the value of the setting parameter of the communication protocol which is set at the present time on the same medium (printing paper) or another medium (printing paper) when printing the entry field specified from the order sheet generator 11 on the medium. In that case, a user can refer to the value of the setting parameter of the communication protocol at the present time. Consequently, it is possible to suppress a possibility that the value of the setting parameter might be set erroneously when carrying out setting through the medium.

In each of the embodiments, moreover, the printer 1 and the printer controller 2 may print, on the medium, the entry field for the value of the setting parameter of the communication protocol, and furthermore, may print a current setting value on the entry field. More specifically, in that case, a choice mark field or a segment paint-over type entry field corresponding to the current setting value is painted over by printing or a character string indicative of the current setting value is printed on a handwriting entry field. When the network of the device is reset to an initial condition such as a factory shipping state, consequently, a medium on which the current setting value is printed in the entry field is set to be the order sheet. By using the order sheet to set the value of the setting parameter, it is possible to simply restore the same setting as before.

What is claimed is:
1. A device comprising:
a reader adapted to optically read contents described on a medium as an image and converting the image into image data;
a network interface adapted to be connected to a network;

a communicator communicating data with a mating device through the network interface in accordance with setting information of a prescribed protocol;
an acquirer acquiring the setting information from the image data; and
a setter setting the acquired setting information to the communicator,
wherein
the communicator communicates with the mating device by using a wireless LAN, and
the acquirer acquires at least one of the setting information including a WEP key and SSID.

2. A device comprising:
a reader adapted to optically read contents described on a medium as an image and converting the image into image data;
a network interface adapted to be connected to a network;
a communicator communicating data with a mating device through the network interface in accordance with setting information of a prescribed protocol;
an acquirer acquiring the setting information from the image data; and
a setter setting the acquired setting information to the communicator;
wherein
the contents described on the medium include an identifier,
the acquirer specifies the setting information from image data of the identifier, and
the acquirer acquires the setting information from the image data of the contents based on the specified setting information.

3. The device including according to claim 2, further comprising:
a printer operable to print a form in which the contents are to be described on a medium.

4. The device according to claim 3, wherein
the printer prints an identifier indicative of the setting information on the medium when printing the form on the medium.

5. The device according to claim 3, wherein
the printer prints a list for the setting information on a medium after the setter sets the setting information to the communicator.

6. The device according to claim 3, further comprising:
a verifier verifying an availability of communication by the communicator in accordance with the setting information of the prescribed protocol or an upper protocol thereof after the setter sets the setting information to the communicator,
wherein the printer prints a result of the verification obtained by the verifier.

7. The device according to claim 3, wherein
the printer prints a list for the setting information being set at the present time on the medium or another medium when printing the form on the medium.

8. The device according to claim 3, wherein
the form includes a plurality of paint-over segments capable of specifying a numeral or an alphabet from a paint-over pattern of the paint-over segment.

9. The device according to claim 3, wherein
the printer prints the form together with the setting information being set at the present time and descried in the form on a medium.

10. A device comprising:
a reader adapted to optically read contents described on a medium as an image and converting the image into image data;
a network interface adapted to be connected to a network:
a communicator communicating data with a mating device through the network interface in accordance with setting information of a prescribed protocol;
an acquirer acquiring the setting information from the image data; and
a setter setting the acquired setting information to the communicator;
wherein
the contents described on the medium include a plurality of paint-over patterns of paint-over segments according to a character including a numeral or an alphabet in a segment paint-over type form,
the acquirer specifies the character from the paint-over pattern, and
the acquirer decides the character to be the setting information.

* * * * *